US008918966B2

(12) United States Patent
Stone

(10) Patent No.: US 8,918,966 B2
(45) Date of Patent: Dec. 30, 2014

(54) FAILSAFE SYSTEM FOR RAISING AND LOWERING AT LEAST ONE OBJECT

(76) Inventor: Peter Stone, Brooklyn, NY (US)

( * ) Notice: Subject to any disclaimer, the term of this patent is extended or adjusted under 35 U.S.C. 154(b) by 0 days.

(21) Appl. No.: 12/927,617

(22) Filed: Nov. 19, 2010

(65) Prior Publication Data

US 2011/0072622 A1 Mar. 31, 2011

Related U.S. Application Data

(63) Continuation of application No. PCT/US2009/006474, filed on Dec. 7, 2009.

(60) Provisional application No. 61/201,817, filed on Dec. 15, 2008, provisional application No. 61/276,923, filed on Sep. 18, 2009.

(51) Int. Cl.
*B66D 1/54* (2006.01)
*F16G 11/10* (2006.01)

(52) U.S. Cl.
USPC ................ 24/134 R; 24/134 KB; 24/134 KA

(58) Field of Classification Search
USPC ............. 24/134 R, 134 KA, 134 KB, 134 KP
See application file for complete search history.

(56) References Cited

U.S. PATENT DOCUMENTS

| | | | | | |
|---|---|---|---|---|---|
| 1,107,934 | A | * | 8/1914 | Hagan | 188/65.1 |
| 2,836,870 | A | * | 6/1958 | Shea | 24/134 KB |
| 3,265,032 | A | * | 8/1966 | Hume | 114/218 |
| 3,765,061 | A | * | 10/1973 | Nash | 24/134 P |
| 4,217,847 | A | * | 8/1980 | McCloud | 114/218 |
| 4,620,499 | A | * | 11/1986 | Slemmons | 114/218 |
| 4,899,423 | A | * | 2/1990 | Randall | 24/134 R |
| 7,073,780 | B2 | * | 7/2006 | Stone | 254/391 |

* cited by examiner

*Primary Examiner* — Robert J Sandy
*Assistant Examiner* — Davis Upchurch

(57) ABSTRACT

A deal with automatic line-locking includes a cam formed of a plurality of generally flat pressure-engaging segments or pressure pads that are angularly laterally offset to opposite sides of the cam plane an beyond the sheet(s) of flat material forming the cam, the segments or pads generally defining a line-receiving region having a generally uniform cross-section greater than the thickness of the sheet(s) of flat material configured to frictionally engage the line in the line locking position. Auxiliary sheave assemblies may be used to provide automatic failsafe operation by means of the cleat when raising or lowering an object on a hook or loop. A pusher may be used to automatically urge the line to move in the direction of the cam to lock the line especially when the line is released.

21 Claims, 12 Drawing Sheets

11
11a
1b
26b
26c
26
14c
26a
11b
53b
53a
15
52c
1c
14d
14g
34
18
22
32
36
38
52
52b
L
16
20
14
12
42
28
24
30
40
52a
44
48
46e
10
54'
54
26d
14f
14a
14b
A
34'
27
26a'
26a"
26'
15a-15c
14e
B
C

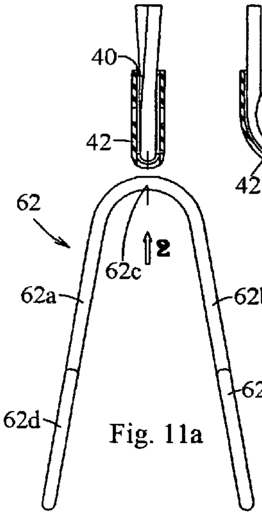
Fig. 11a
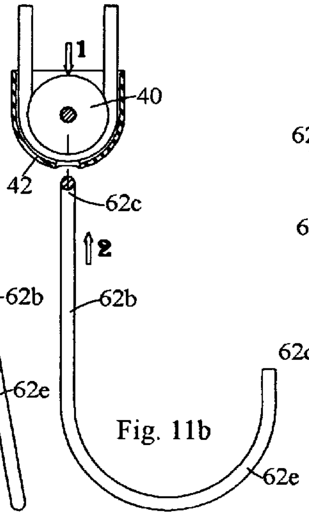
Fig. 11b
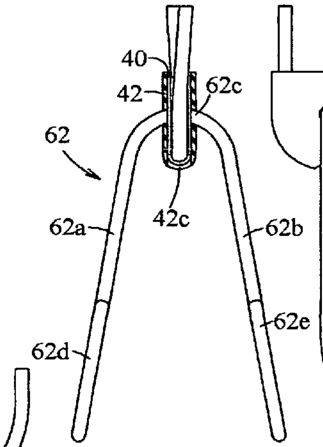
Fig. 12a
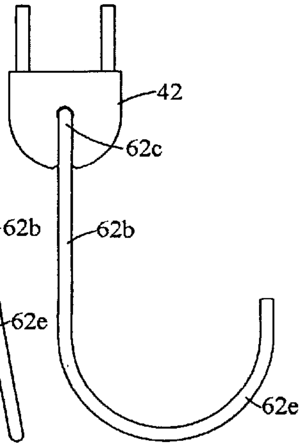
Fig. 12b
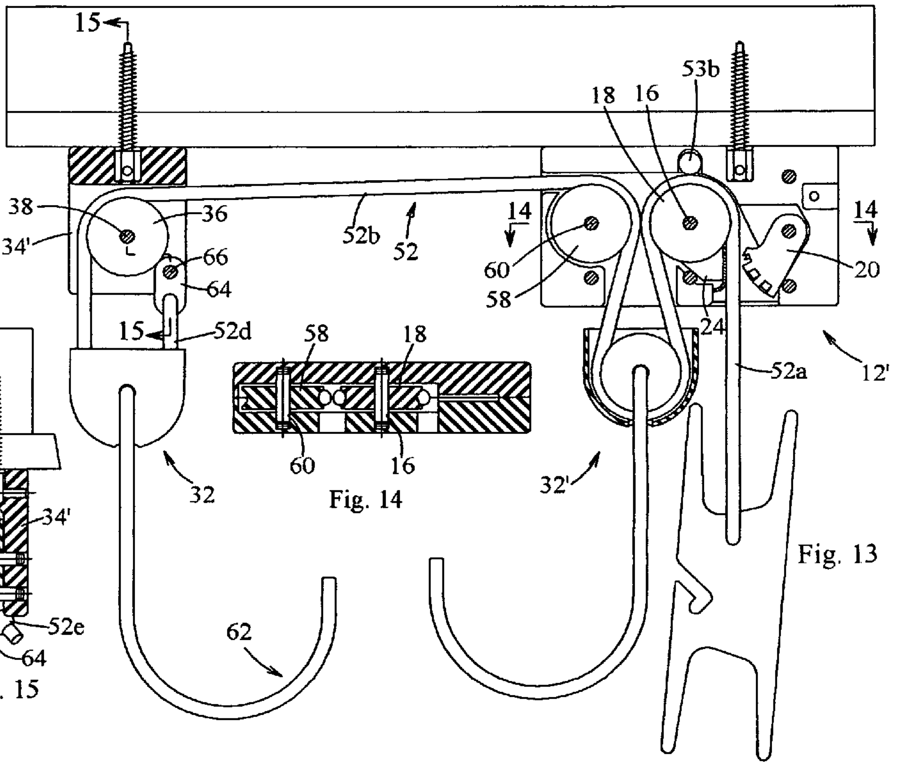
Fig. 14
Fig. 13
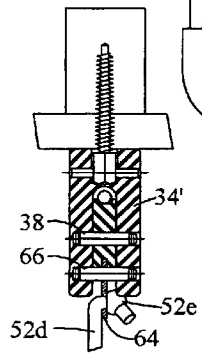
Fig. 15

FAILSAFE SYSTEM FOR RAISING AND LOWERING AT LEAST ONE OBJECT

CROSS-REFERENCE TO RELATED APPLICATIONS

This is a continuation application of International Application No. PCT/US2009/006474 with an international filing date of Dec. 7, 2009, currently pending, which claims priority of U.S. Provisional Patent Application No. 61/201,817 filed on Dec. 15, 2008 and U.S. Provisional Patent Application No. 61/276,923 filed on Sep. 18, 2009.

BACKGROUND OF THE INVENTION

1. Field of the Invention

The invention generally relates to line control devices and, more specifically to a failsafe system raising and lowering at least one object.

2. Description of the Prior Art

One traditional or common device for securing a line from advancing relative to a reference point is a cam cleat that includes a support structure through which the line passes and one or two pivotally mounted cams within the structure that can move between a first position in which the cam(s) permits the line to move along a given direction and a second position in which the cam(s) engages the line by applying pressure to it to prevent the line from advancing in an opposite direction with respect to a support structure.

Known cams generally have had a thickness that substantially corresponded to the diameter of the line and have been provided with a series of spaced teeth or ridges that are generally transverse to the direction of movement of the line. When the movement of the line needed to be halted the cam was rotated to contact the line and the teeth penetrated and deformed the line within a confined passageway to create a pressure and/or friction that prevented the line from advancing. However, traditional cleats of this type have a number of disadvantages. For example, such cleats normally require numerous operative parts, including a spring that normally urges the cam to be biased into contact with the line. As such, the line must normally be manually inserted into the cleat by moving the cam to a non-locking position against the action of the spring. The need for numerous working parts makes the cleat more costly to manufacture and more susceptible to failure. Assembly of the cleat and its numerous parts contributes to the high cost of manufacture.

Because the cams typically have a thickness that approximates the diameter of the line being controlled such cleats tend to be large and bulky. Also, the cams need to be molded or cast to provide the desired cam thicknesses and, thus, cannot be made of relatively thin sheet material. Also, a serious problem is the damage that traditional cleats cause to the lines that are controlled. Because the lines are locked in place when the relatively sharp teeth edges or ridges of the cams penetrate and deform the lines by applying substantial transverse forces that bite across the fibers or strands of the line, the sharp teeth frequently damage the strands or fibers forming the lines by and, with time, the teeth of the cams deteriorate the integrity of the strands or fibers and, therefore, also of the lines as well. Repeated or continued uses of the cleat frequently render the lines unsuitable for extended use. This not only jeopardizes the operation and safety of the apparatus on which the cleat is used, such as a machine or sailboat, for example, but also requires regular replacements of the lines. This is a further inconvenience and costly operation.

In U.S. Patent Application No. 61/201,817, assigned to the assignee of the subject application, a cam formed of planar material and devices using the same are disclosed. However, the pulley or sheave is not always optimum for desired applications, including systems for raising and lowering potted plants, bicycles and other objects as they are not constructed from an optimal number of reduced parts or components. Such construction(s) increase the costs of manufacture and hence the cost to the consumer. Also, some of the components described in the aforementioned application are sometimes difficult or inconvenient to mount onto a ceiling or a wall.

SUMMARY OF THE INVENTION

It is an object of the invention to provide a novel system for raising and lowering objects.

It is another object of the invention to provide such a system that does not have the disadvantages of know cams used for line control.

It is still another object of the invention to provide such a system as in the previous objects that is formed of flat sheet material.

It is yet another object of the invention to provide such a system of the type suggested in the previous objects that can be formed by die cutting or stamping.

It is still another object of the invention to provide such a system that has a thin profile and can be housed in a narrow profile support structure.

It is yet another object of the invention to provide such a system that can provide effective frictional engagement with a line without unduly penetrating or deforming the line when secured against movement.

It is an additional object of the invention to provide such a system that provides a frictional line-engaging surface that does not damage the strands or fibers within a line thereby increasing the useful life of the line and avoids the need to regularly or frequently replace the line.

It is still an additional object of the invention to provide a simplified pulley or sheave construction that minimizes or reduces the number of components for assembly and that, therefore, reduces the cost thereof.

It is also an object of the invention to provide a cleat-block within a system of the previous objects for raising and lowering objects.

It is also an additional object of the invention to provide a system that is simple and convenient for mounting on a ceiling or wall and only requires the most basic of tools.

In order to achieve the above objects, and others that will become apparent hereafter, a system for raising and lowering objects includes a cleat for selectively locking and releasing an elongate member in accordance with the invention comprises a support member having two generally opposing ends and an internal channel extending between said opposing ends along a predetermined direction and dimensioned for passage of an elongate member, such as a line, there-through. Said support member has a cavity proximate to said channel and communicates therewith. A cam within said cavity comprises a generally flat portion defining a cam plane and has pivot means about which the cam can pivot within said cam plane and defines a generally arcuate peripheral portion spaced from said pivot means. Engaging means along said arcuate peripheral portion for engaging an elongate member generally extends within said cam plane and applies incremental pressures to the elongate member to urge the elongate member against a generally fixed surface with movements of the cam from a first non-engaging position to a second locking position as the cam pivots about said pivot means. The engaging means includes pressure-applying pads extending from said flat portion along said arcuate peripheral portion to both sides of said cam plane to define an engaging surface that generally conforms to the exterior shape of the elongate member.

Preferably, the cleat with automatic line-locking comprises a frame having proximate and remote sides and formed with a passageway, extending between said proximate and remote sides, for receiving a line for movement along a first line moving direction from said proximate to said remote sides and an opposing line pulling direction from said remote to said proximate sides, and defining a line bearing surface or limit stop on one side of said passageway for limiting excessive transverse movements of the line in a direction to said one side of said passageway. Cam means is provided on said frame on the other or opposite side of said passageway and has a line engaging portion normally spaced a predetermined distance from the line, said cam means being movable between a line releasing position and a line locking position, said cam means being arranged to normally disengage from the line, engagement of the line by said cam means to said line locking position while advancing the line in said first line moving direction from said proximate to said remote sides creating a force couple that wedges the line between said line bearing surface or limit stop and said cam that tends to arrest or stop the line relative to said frame fixed on the support surface. Said cam means is formed of generally flat sheet material defining a cam plane and said line engaging portion being formed of a plurality of generally flat pressure-engaging segments or pressure pads that are angularly offset to opposite sides of said cam plane and together generally defining a line-receiving region having a generally uniform cross-section configured to frictionally engage the line in said line locking position.

A self-actuating cleat for automatically arresting the movement of an elongate member, such as a line, when the tension within the elongate member drops below a predetermined or threshold value in accordance with the invention comprises a support member having two generally opposing ends and an internal channel extending between said opposing ends along a predetermined direction and dimensioned for passage of the elongate member there-through. Said support member has a cavity proximate to said channel and communicates therewith. A cam within said cavity comprises a generally flat portion defining a cam plane and has pivot means about which the cam can pivot within said cam plane and defines a generally arcuate peripheral portion spaced from said pivot means. Engaging means along said arcuate peripheral portion for engaging the elongate member generally extends within said cam plane and applies incremental pressures to the elongate member to urge the elongate member against a generally fixed surface with movements of the cam from a first non-engaging position to a second locking position as the cam pivots about said pivot means. Said engaging means includes pressure applying pads extending from said flat portion along said arcuate peripheral portion to both sides of said cam plane to define an engaging surface that generally conforms to the exterior shape of the elongate member. First biasing means normally urges said cam to said first non-engaging position. Second biasing means normally urges the elongate member into engagement with said cam only when the tension in the elongate member is below said predetermined tension. Said first biasing means releases said cam when an advancing elongate member engages said cam to urge said cam to move from said first non-engaging position to said second engaging position.

Other devices using the novel cam can be used in a multitude of devices where line control is important, such as on sailing yachts, raising and lowering objects such as potted plants, bicycles and the like. Improved mounting hardware and auxiliary sheave constructions reduce the number of components and simplifies assembly and thus reduce the costs of manufacture.

BRIEF DESCRIPTION OF THE DRAWINGS

These and other objects will become apparent when the present invention is considered in detail in the below specification, taken in conjunction with the drawings as follows:

FIG. 2 is an exploded view of the sheave wheel used in the cleat of FIG. 1*a* separated from the pusher element that is normally pivotally mounted on the same pin or shaft that the sheave wheel is rotatably mounted on;

FIG. 11*a* is a front elevational view similar to FIG. 6*a* but with a different U-shaped hook suitable for supporting a larger object such as a bicycle;

FIG. 11*b* is a side elevational view of the hook and associated sheave or pulley shown in FIG. 11*a;*

FIG. 12*a* is similar to FIG. 11*a*, but illustrating the hook secured within and supported by the movable sheave;

FIG. 12*b* is a side elevational view of the movable sheave and associated hook shown in FIG. 12*a;*

FIG. 13 is similar to FIG. 1*a*, with a modified cleat to provide multiple movable pulleys or sheaves, with associated hooks of the type shown in FIGS. 11*a*-12*b*, for simultaneously raising and/or lowering an object such as a bicycle while maintaining the object in a generally horizontal or fixed orientation;

FIG. 14 is a cross-sectional view of the modified cleat shown in FIG. 13, taken along line 14-14;

FIG. 15 is a cross-sectional view of the stationary pulley or sheave shown in FIG. 14, taken the along line 15-15;

DESCRIPTION OF PREFERRED EMBODIMENTS

Figures 1A, 1B, 1C:
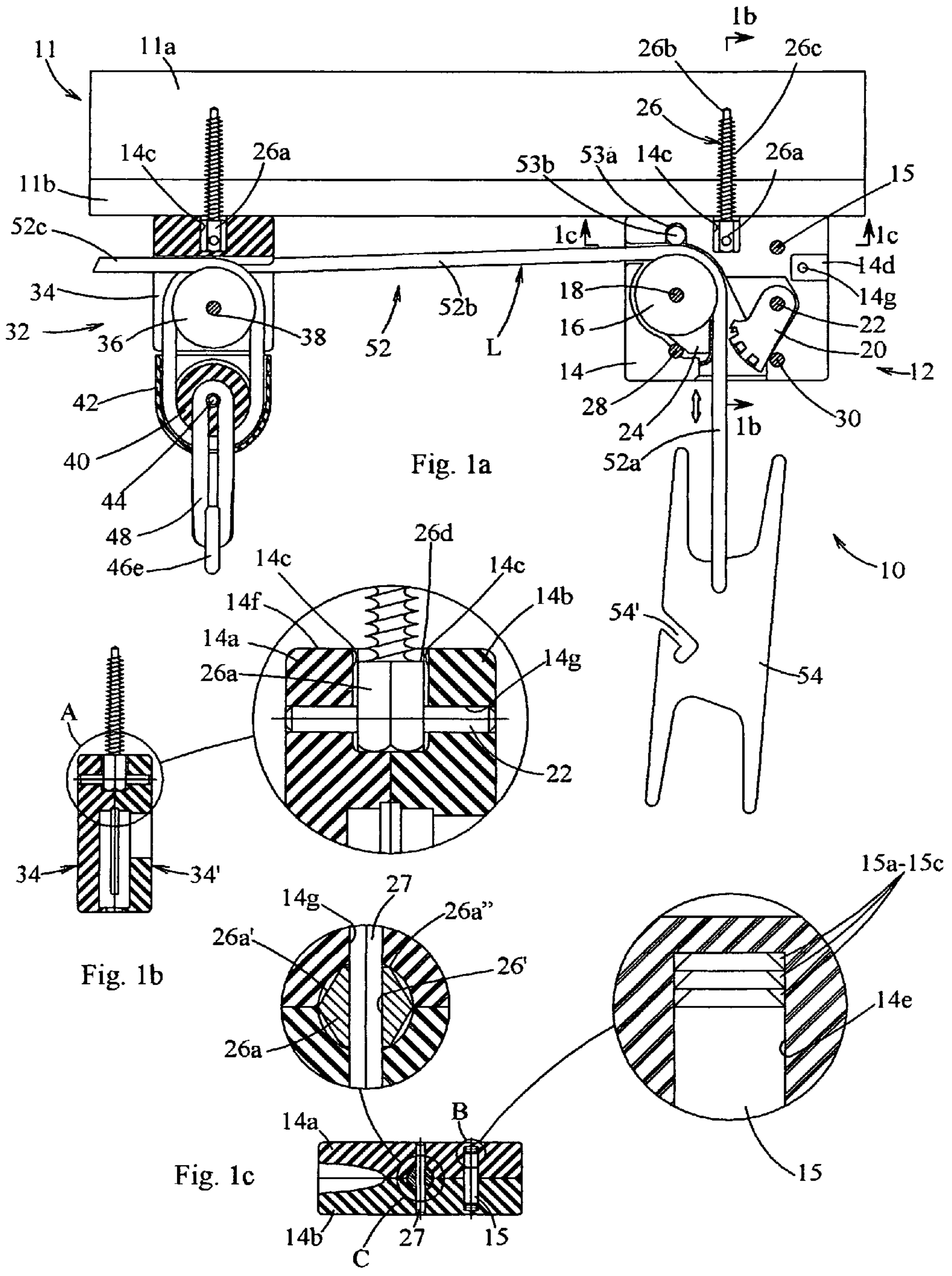
FIG. 1*a* is a side elevational view of a failsafe system to raise and lower objects in accordance with the present invention, shown partially in cross-section to illustrate the path of the control line and the details of mounting on a ceiling.
FIG. 1*b* is a cross-sectional view of the cleat shown in FIG. 1*a*, taken along line 1*b*-1*b*, and also showing an enlarged region A to illustrate the construction of a fastener for mounting the cleat onto a ceiling.
FIG. 1*c* is a cross-sectional view of the cleat shown in FIG. 1*a*, taken along line 1*c*-1*c*, and also showing enlarged regions B and C to illustrate the construction or assembly details of the clamshells forming the housing of the cleat and also for retaining the fastener for attaching the cleat to a ceiling.

Referring now to the Figures, in which identical or similar parts are designated by the same reference numerals throughout, and first referring to FIGS. 1*a*-1*c*, a failsafe system for raising and/or lowering an object or a plurality of objects in accordance with the present invention, is generally designated by the reference numerals 10.

The cleated system of pulleys or sheaves 10 is configured to be conveniently mounted onto a ceiling 11*a* by a consumer of average mechanical skills and with the simplest of tools, such as a screwdriver. The cleated system 10 includes a cleat 12 for locking/unlocking a control line L, as to be more fully described.

The cleat 12 includes a housing 14 that is shown to be generally rectangular in shape. However, as will become evident, the specific shape of the housing 14 is not critical and generally any rectangular or other configuration suitable for the purpose, such as a square configuration, can be used.

The housing 14 is formed of two clam shells 14*a*, 14*b*, as best shown in FIGS. 1*b* and 1*c*. The housing 14 includes a top or upper cavity 14*c* for receiving a ceiling fastener, as to be described. The housing 14 is similarly provided with a side cavity 14*d* for receiving a wall fastener, as to be described. As shown in FIG. 1*c* the housing is provided with a plurality of spaced, distributed closed bores 14*e* for receiving self-locking pins 15. The pins 15 are provided with external dimensions that are slightly larger in diameter than the diameters or internal dimensions of the channels or bores 14*e* so that the pins 15 can only be received within the bores by press fit requiring slight expansion of the bores to provide adequate friction between the pins 15 and the bore internal surfaces to prevent inadvertent separation once the pins are forced into the bores. To insure a substantially permanent assembly, the pins are advantageously provided with a series of serrations 15*a*-15*c* (FIG. 1*c* inset) that are configured or shaped as shown to allow easier entry than removal of the pins by ensuring significantly higher frictional forces for removing the pins once they are force-fit into an associated bore. When the clam shells are aligned to register each of the pins 15 with an associated pair of opposing bores opposing pressures can be applied to the shells 14*a*, 14*b* to urge each of the pins into opposing associated bores when the shells 14*a*, 14*b* are formed of a material that can be slightly deformed when sufficient pressures are applied, such as would be the case with Nylon or other similar plastic materials.

Suitable transverse holes or apertures 14*g* are provided within each of the cavities 14*c*, 14*d*, for reasons to be described.

Figure 2:
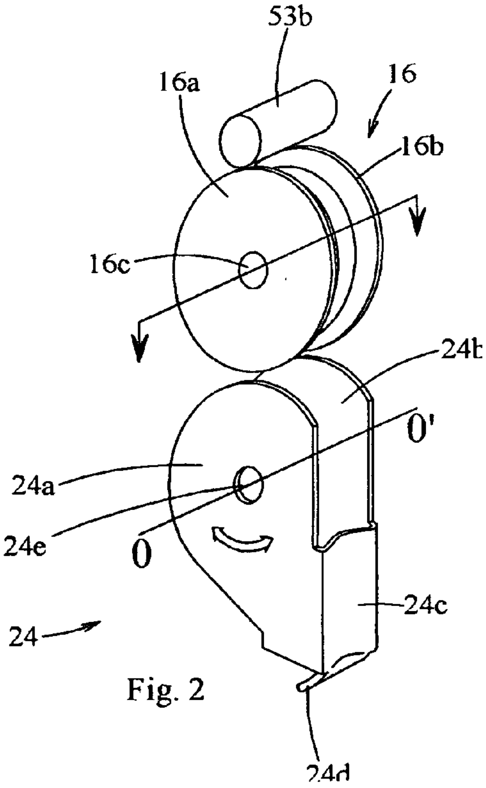
Figure 3A:
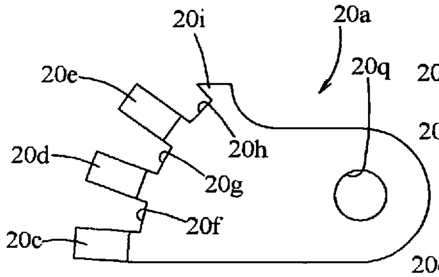
FIG. 3*a* is a side elevational view of one of the stamped sheets of material forming the cam illustrated in the cleat of FIG. 1*a;*
Figure 3B:
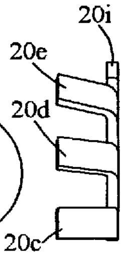
FIG. 3*b* is a front elevational view of the stamped sheet shown in FIG. 3*a;*
Figure 4A:
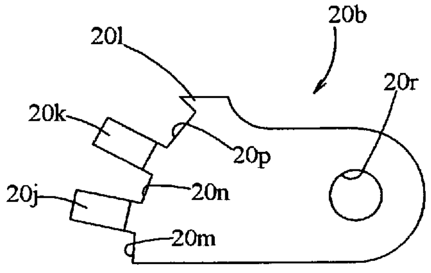
FIG. 4*a* is similar to FIG. 3*a* of the associated or other of the stamped sheets of material forming the cam.
Figure 4B:
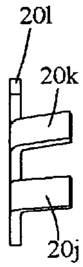
FIG. 4*b* is similar to FIG. 3*b* for the other stamped sheet shown in FIG. 4*a;*

Within the housing 14 there is provided a sheave or pulley wheel 16 rotatably supported on a horizontal pin 18 that bridges the two clam shells 14*a*, 14*b*, a cam 20 being similarly pivotally mounted on a pivot pin 22 horizontally arranged to bridge between the two clam shells. A pusher 24, to be more fully described in connection with FIG. 2, is mounted for pivotal movements about the same pin 18 that supports the sheave or pulley wheel 16. The general construction and operation of the cam 20 has been described in U.S. Patent Application No. 61/201,817 and such application is incorporated by reference as if fully set forth herein. The aforementioned application also describes the general failsafe operation of the cleat 12 and, therefore, the details of such operation will not be fully set forth herein.

Although numerous methods may be used for mounting the cleat 12 to a ceiling and/or wall, a presently preferred embodiment includes a fastener 26 that has one free end 26*a* that may have a multi-faceted cross-section such as a generally hexagonal cross-section, as best shown in FIGS. 1*b* and 1*c*. At the opposing end of the fastener 26 is a self tapping tip 26*b*, a threaded shank 26*c* being provided between the ends suitable for use with a ceiling beam or any other wooden or similar solid support member.

Figure 1D:
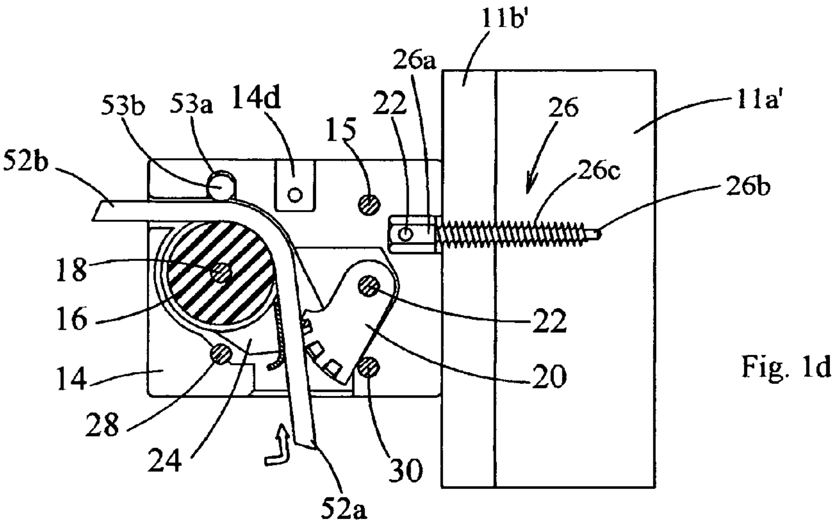
FIG. 1*d* is a side elevational view of the cleat shown in FIG. 1*a*, shown mounted on a wall.
Figure 1E:
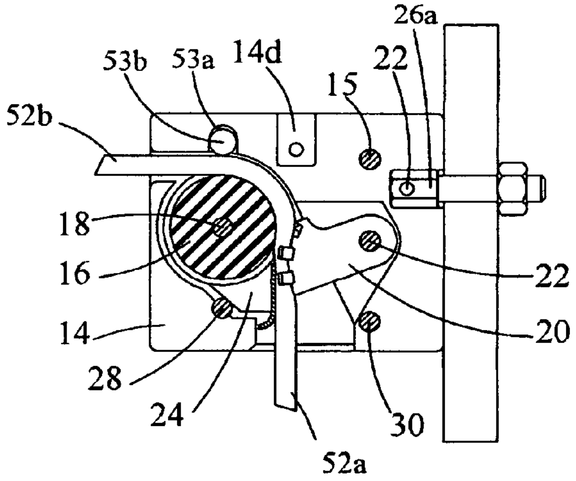
FIG. 1*e* is similar to FIG. 1*d*, but illustrating the use of a different mounting fastener for mounting the cleat onto a vertical support member by using a threaded bolt and nut.

A pin 28 embedded within the clam shells 14*a*, 14*b* is parallel to the pin 18 also serves as a stop pin for the pusher 24 to hold the pusher in a predetermined rest position to maintain the line L spaced a desired distance from the cam 20. Similarly, a pin 30, generally parallel to the pin 22, serves as a stop pin for the cam 20 to maintain the initial engaging portions of the cam, as to be described, a predetermined or desired distance from the line L. Thus, the pin 28 prevents excessive pivoting of the pusher 24 in a clockwise direction while the pin 30 prevents excessive pivoting of the cam 20 in a counterclockwise direction. The pusher 24 includes two side walls 24*a*, 24*b* that are pivoted on pin 18 and support a transverse wall 24*c* that, serves as a line bearing or limit stop for the line against excessive movement towards the left, as viewed in FIG. 1, in response to the forces applied by the advancing cam 20. Thus, the pusher serves, with or without the stop pin 28, as a bearing or stop surface against which the cam may press the line and wedge to arrest further movements of the line. However, as will be clear from the description of FIGS. 23*a*-24*d* any bearing or stop surface may be used even if a fixed surface on the housing without the use of a pusher or stop pin.

While the cleat 12 may, in some applications, be used alone, the system of the present invention also contemplates the use of one or more auxiliary sheave or pulley assemblies 32. In FIG. 1*a* only one auxiliary sheave assembly 32 is shown, although additional sheave assemblies can be mounted in tandem to allow the lifting or lowering of an object, such as a potted plant, or a plurality of objects, individually or in unison depending on the configuration of the pulleys or sheaves, as will be more fully described below.

The auxiliary sheave assembly 32 includes an upper housing, frame or support bracket 34 generally having an inverted U-shaped cross-section that rotatably supports a fixed sheave or pulley wheel 36 mounted for rotation about a horizontal pin 38. The sheave assembly 32 also includes a movable sheave wheel 40 housed within a movable shield or cover 42 and arranged for rotation about a horizontal pin 44, which may be a straight pin or a horizontal portion of a depending hook or the like, as will be more fully described below.

Figure 6A:
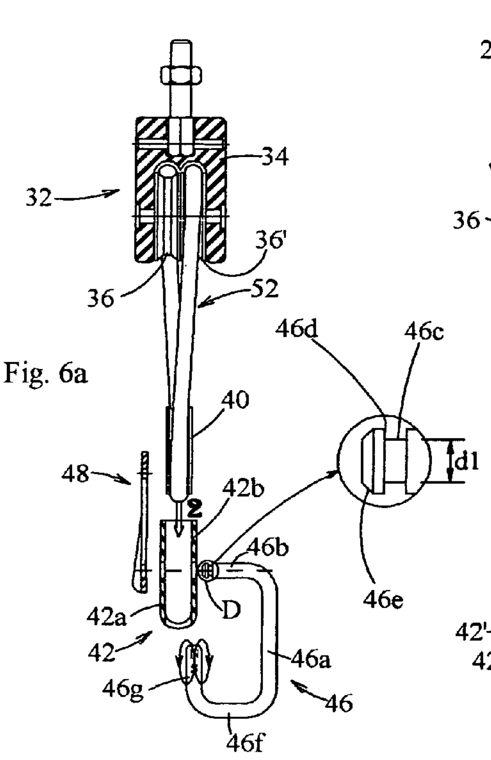
FIG. 6*a* is a front elevational view of a system of pulleys or sheaves including a threaded bolt and nut fastener for attaching to a ceiling or horizontal member, and showing an exploded view of the moving sheave for supporting an object, such as a potted plant, and showing an exploded view of a region D illustrating details of assembly of the movable sheave and hook arrangement.
Figure 10A:
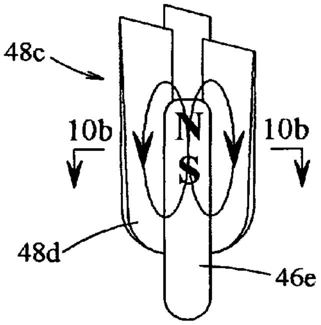
FIG. 10*a* is an enlarged side elevational view of region F in FIG. 9*b;*
Figure 10B:
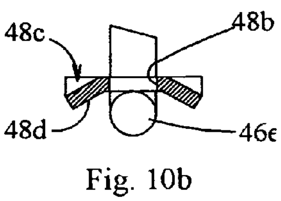
FIG. 10*b* is a cross-sectional view of the hook and locking plate shown in FIG. 10*a*, taken along line 10*b*-10*b;*
Figure 16A:
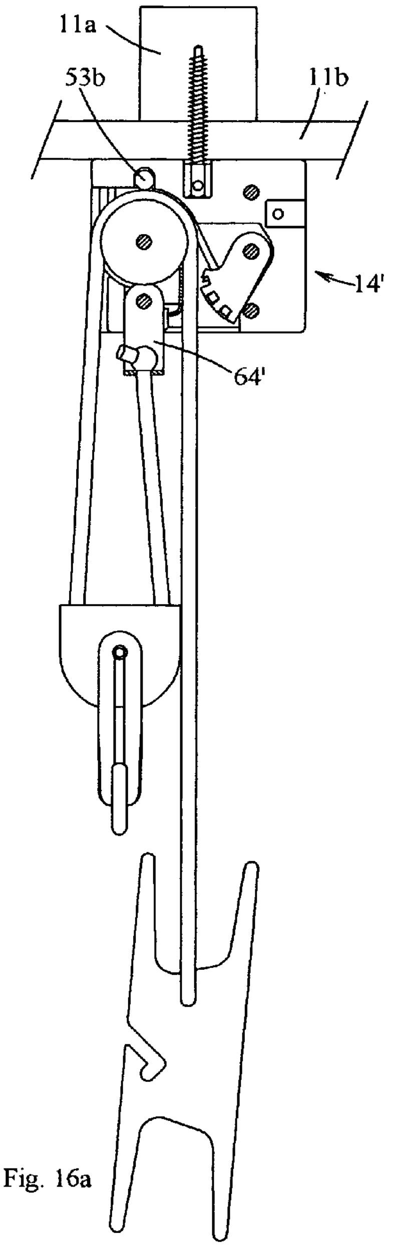
FIG. 16*a* illustrates a modified, ceiling-mounted cleat for raising and/or lowering a single object with a single movable pulley or sheave.
Figure 16B:
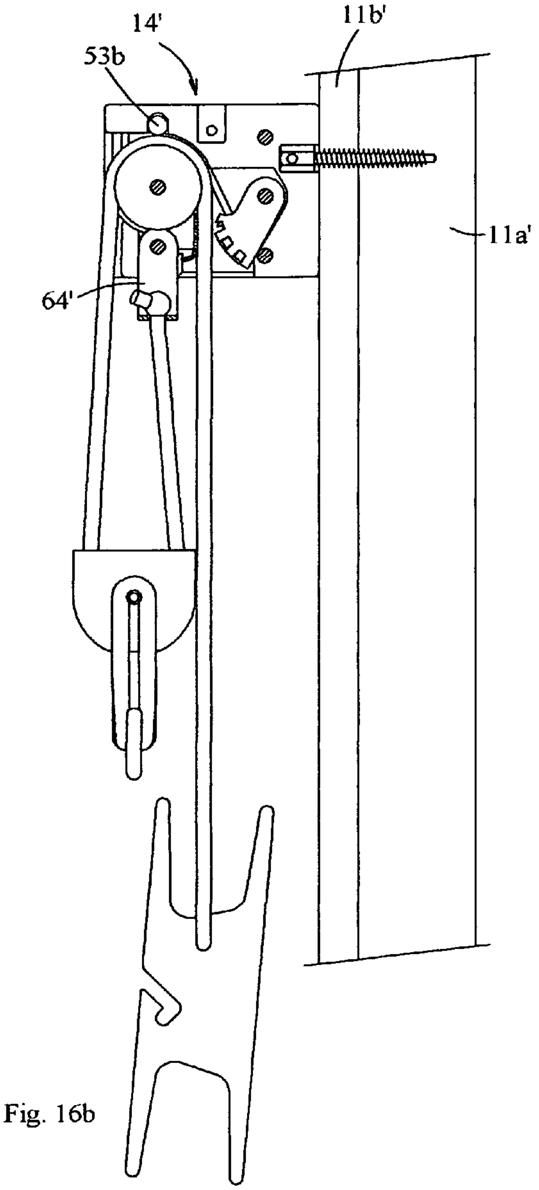
FIG. 16*b* is similar to FIG. 16*a*, but shown mounted on a vertical surface such as a wall.

Referring to FIGS. 1*a* and 6*a*, one arrangement is illustrated for assembling the auxiliary sheave assembly 32. A C-shaped hook 46 (FIG. 6*a*) includes a vertical portion 46*a*, an upper horizontal portion 46*b* formed with a circumferential groove 46*c* at it's free end. A circular lip or ridge 46*d* (FIG. 6*a* inset) is provided formed with a taper or bevel 46*e* to provide a locking mechanism to be described. The lower portion 46*f* is substantially parallel to the portion 46*b* which is provided with an upwardly directed magnetized end 46*g* which is substantially vertically aligned with the groove 46*c* but slightly offset from the groove. The portions 46*a*-46*g* form a generally closed loop or hook that is only open between the free end of the portion 46*b* the portion 46*g*. To bridge that opening and form a totally closed loop there is provided an elongate generally flat locking plate 48 which, as best shown in FIGS. 6*b*, 7*b*, 8*b* and 9*b*, is provided with an elongate slot 48*a* formed at the lower end with an enlarged generally circular end 48*b* at the lower end 48*c* which is preferably formed with angled surfaces 48*d*, 48*e*, as best shown in FIGS. 10*a*, 10*b* to insure centering and retention of the locking plate 48 in relation to the portion 46*g* of the hook 46.

Figure 6B:
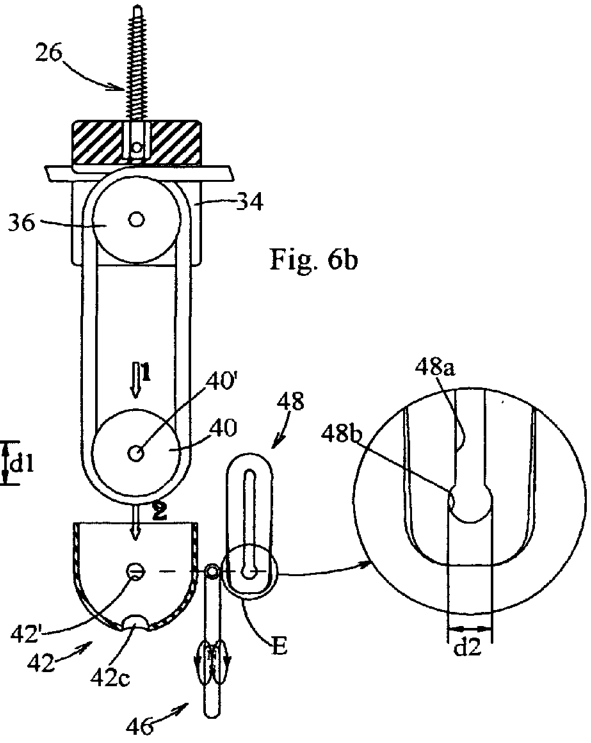
FIG. 6*b* is a side elevational view of the system of pulleys or sheaves shown in FIG. 6*a* and showing an exploded view of region E showing the details of the hook locking plate that facilitates assembly of the movable pulley or sheave.
Figure 7A:
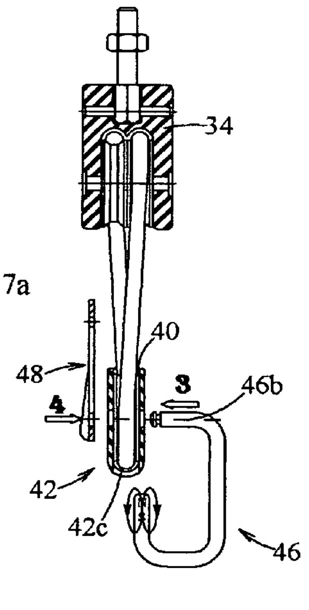
FIG. 7*a* illustrates the details of the movable pulley or sheave of FIG. 6*a* just prior to final assembly.
Figure 7B:
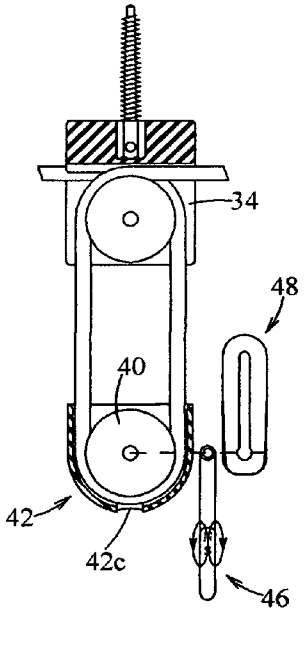
FIG. 7*b* is a side elevational view of the pulley system shown in FIG. 7*a;*
Figure 8A:
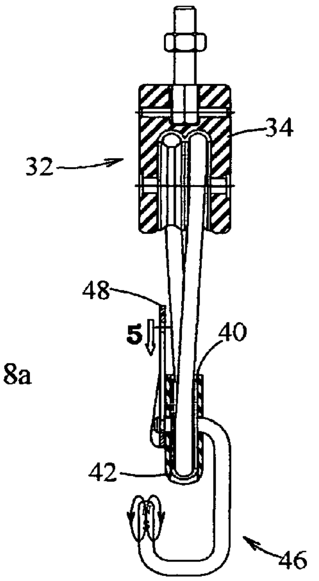
FIG. 8*a* illustrates another step in the assembly of the movable pulley or sheave shown in FIGS. 6*a*, 6*b*, 7*a* and 7*b*, in which the movable pulley or sheave is secured into its shield or case.
Figure 8B:
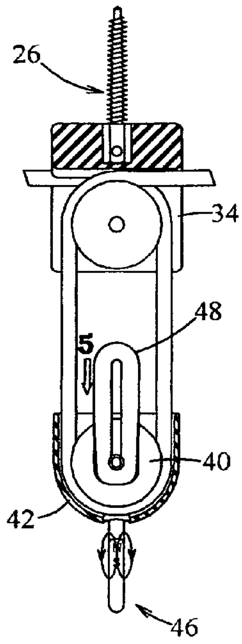
FIG. 8*b* is a side elevational view of the movable pulley or sheave shown in FIG. 8*a;*
Figure 9A:
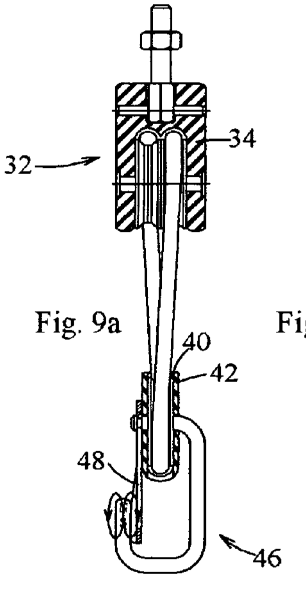
FIG. 9*a* is similar to FIG. 8*a* but illustrates the assembled movable sheave in its final state of assembly and ready for supporting an object or load on the hook supported by the movable sheave or pulley.
Figure 9B:
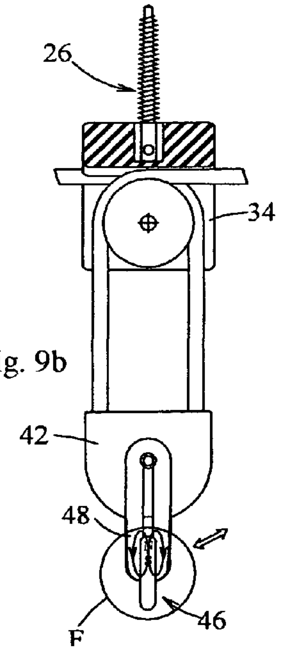
FIG. 9*b* is a side elevational view of the movable pulley or sheave shown in FIG. 9*a;*

The assembling of the auxiliary pulley or sheave 32 will now be described in relation to FIGS. 6*a*-10*b*. In FIGS. 6*a*, 6*b* the movable sheave or pulley wheel 40 is initially placed on and supported by the line 52 as suggested by arrow 1 and arranged in a substantially vertical plane as shown in FIG. 6*b*. The sheave or pulley wheel 40 is lowered, as suggested by arrow 2, into the shield or cover 42 to align a horizontal hole or bore 40' in the sheave wheel with a corresponding or associated hole 42' in the shield or cover 42 so that these are aligned as shown in FIGS. 7*a*, 7*b*. As suggested by arrow 3 FIG. 7*a* the upper horizontal portion 46*b* is extended through the elongate hole 40' in the sheave or pulley wheel 40 and the associated openings 42' in the shield or cover 42. As suggested by arrow 4 in FIG. 7*a*, the locking plate 48 is slipped over the taper 46*e* and the lip or ridge 46*d* so that the latter pass through the enlarged opening 48*b* to bring the locking plate 48 into alignment with the groove 46*c*. The thickness of the locking plate 48 is preferably just slightly less than the width of the groove 46*c* so that the locking plate can be lowered while engaged with the free end of the horizontal portion 46*b*, as suggested in FIG. 8*a*. The length of the locking plate 48 is selected so that when it is lowered to bring the groove 46*c* to the upper end of the slot 48*a*, the lower end of the locking plate, including the angled surfaces 48*d*, 48*e*, abut against the upper free end of the portion 46*g*, as shown in FIGS. 9*a*-10*b*. In a presently preferred embodiment, at least the lower end of the locking plate 48 is formed of a magnetizeable material, such as steel, and the portion 46*g* is magnetized to attract the locking plate and maintain those two elements in contact to ensure that the hook 46 is totally closed during normal use. Of course, the selection of materials and levels of magnetization will determine the magnitude of the attractive forces between the locking plate 48 and the portion 46*g*. However, such forces can be selected to allow manual separation by a user upon application of a force to the locking plate greater than the magnetic attractive forces so that the locking plate 48 can be selectively separated and moved to effectively open the hook, as suggested in FIG. 9*b*. With this construction, placement of an object on the hook 46, such as a potted plant, ensures that the object remains attached to the auxiliary sheave assembly 32 as it is raised and lowered.

Figure 5A:
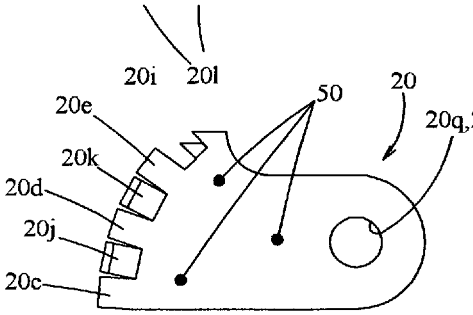
FIG. 5*a* is a side elevational view of the assembled cam shown in FIG. 1*a* formed of the stamped sheets shown in FIGS. 3*a*-4*b*, showing spot welds to secure the stamped sheets to each other.
Figure 5B:
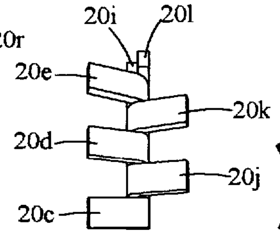
FIG. 5*b* is a front or end elevational view of the assembled cam shown in FIG. 5*a;*
Figure 5C:
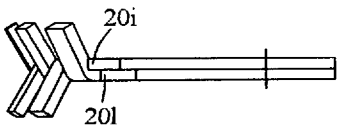
FIG. 5*c* is a top plan view of the cam shown in FIGS. 5*a* and 5*b;*

Referring to FIGS. 3*a*-5*c*, a cam construction is illustrated formed of two cam sections 20*a*, 20*b* each of which can be stamped or die-cut from flat of planar sheet material such as steel. As more fully discussed in U.S. Patent Application No. 61/201,817, which is incorporated by reference as if fully set forth herein, cam plate 20*a* includes spaced fingers, pressure pads or segments 20*c*-20*e* forming spaces or gaps 20*f*-20*h* with a first spike or gripping point 20*i*. As shown in FIG. 3*b* the three fingers 20*c*-20*e* are deflected or bent out of the plane of the sheet material, to the left as viewed in FIG. 3*b*. Similarly, cam plate 20*b* is formed with fingers 20*j*-20*k* and a second spike or gripping point 201, forming spaces or gaps 20*m*-20*p* The fingers 20*j*, 20*k* are deflected out of the plane of the sheet material forming cam plate 20*b*, to the right as viewed in FIG. 4*b*. The fingers and spaces or gaps formed between the fingers on the two plates are offset from each other so that they can mate or interlock as shown in FIGS. 5*a*-5*c* to interleave the fingers and form a generally curved V-shaped region suitable for receiving and engaging a line. As best as shown in FIG. 5*a* the two spikes or gripping points 20*i*, 201 are slightly offset from each other. The two cam plates, once superimposed or mated as described can be secured to each other in any suitable or conventional manner such as spot welds 50 shown in FIG. 5*a*.

Figure 5D:
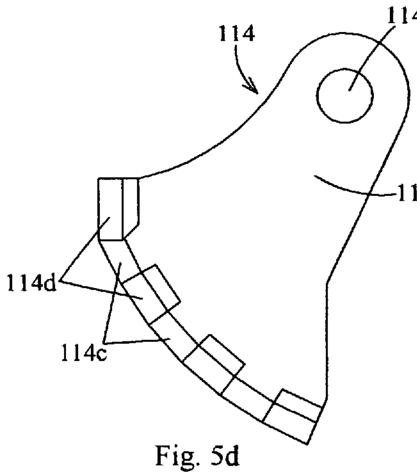
FIG. 5*d* is a side elevational view of the cam of FIG. 1 stamped from a single sheet of material.
Figure 5E:
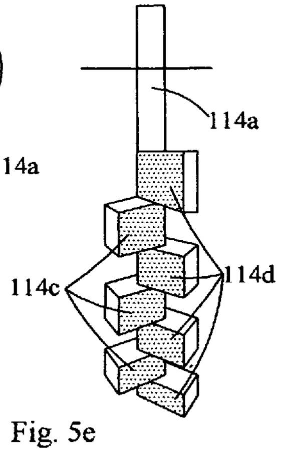
FIG. 5*e* is a front elevational view of the cam shown in FIG. 5*d;*
Figure 5F:
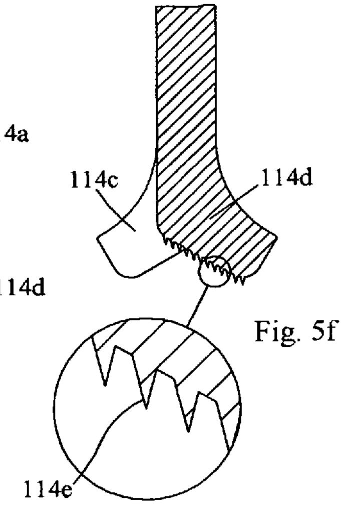
FIG. 5*f* is an enlarged section of the cam shown in FIGS. 5*d*, 5*e* and an enlarged detail of one embodiment of a surface texture of the line engaging surfaces of the cam.

Referring to FIGS. 5*d*-5*f*, a further embodiment of the cam is illustrated and designated by the reference numeral 114 formed of a single sheet of material 114*a*, such by stamping. The cam 114 is formed with an opening such as a round hole 114*b* suitable for insertion of a pivot pin and is provided with a series of pressure pads 114*c*, 114*d* that alternatingly angularly project substantially equal angles to opposite sides of the plane of the sheet material 114*a* as best shown in FIG. 5*e*. The deflection or offset angles from the cam plane can be any suitable amount to accommodate a given diameter of line and may preferably be within the range of 50 to 70 degrees. However, the optimal angles of deflection are 60 degrees from the cam plane to provide a total angle of 120 degrees between opposing pressure pads, simulating the internal angles of a hexagon which provide a good approximation of the cylindrical outer surface of the line. Optionally, the outwardly facing surfaces of the pressure pads 114*c*, 114*d* are generally directed in a direction away from the hole 114*b* and are provided with pointed elements in the nature of spikes or barbs 114*e*. Tacky materials or any other techniques may be used instead of the spikes or barbs for better engaging or frictionally gripping the line with different degrees of advantage.

The manner of securing the cleat 12 and the sheave assembly or assemblies 32 to a ceiling or to a wall will now be described. To secure these components to a ceiling the driven ends 26*a* of the fasteners 26 are inserted into the upper cavities 14*c*, the driven end 26*a* being provided with a through hole 26' aligned with the hole 14*g*. A pin 27 is inserted through the hole 14*g* in the housing 14 and through the driven end 26*a* to capture the fastener 26 and secure it to the housing. With this construction, the housing to which the driven end 26*a* is secured in effect becomes a part of the fastener and can be used for driving it without the use of additional tools. After a pilot hole (not shown) is drilled in a ceiling beam 11*a* the fastener 26 can be screwed into the beam by rotating the housings about the axes of the fasteners 26 until the upper surface 14*f* (FIG. 1*b*, region A) is flush or abuts against the lower surface of the ceiling, as shown in FIG. 1*a*. By rotating the housing 14 and, therefore, the fastener 26, slightly beyond the initial point of contact between the housing and the ceiling surface the housing is drawn up against the ceiling surface and fractionally engage the same. The housing may then be rotated slightly further or back to align the housing in a desired orientation while maintaining frictional engagement to prevent inadvertent movements during use.

Once the auxiliary sheave assembly 32 and the cleat 12 have been mounted on a ceiling, as shown in FIG. 1*a*, a line 52 is extended through these components. A window or opening 34' may be provided to facilitate the manipulation and winding of the line about the pulley or sheave wheel 36, as shown in FIG. 1*b*. An initial vertical portion 52*a*, attached to a storage spool 54, is received between the cam 20 and the pusher 24, initially making contact only with the pusher 24 with a resulting gap between the line portion 52*a* and the cam. The line is then passed over the sheave wheel 16 and a horizontal portion of the line 52*b* extends to the auxiliary sheave assembly 32 where the line passes over a first fixed a sheave wheel 36, and then under the movable sheave wheel 40, and then up again over a fixed sheave wheel 36 (FIG. 6*a*) before exiting the auxiliary sheave assembly at 52*c*.

Advantageously, a horizontal circular channel 53*a* is positioned above the sheave 16, the channel being open at the bottom to expose the channel 53*a* to the line portion 52*b*. A roller 53*b* is positioned within the channel 53*a* and has a diameter smaller than the diameter of the channel 53*a* so that the roller can freely rotate within the channel with clearance and so that the lowermost surface of the roller protrudes through the channel and can make contact with the line portion 52*b* as it passes over the sheave. The roller 53*b* is preferably made of a metal or other material that can exhibit sufficient weight on the flexible line to apply a downward force on the line to insure sufficient friction between the roller 53*b* and the sheave 16 to cause the sheave to rotate whenever the line advances over the sheave. This additionally insures that movement of the line also causes the rotation of the pusher 24.

In the presently preferred embodiment, the pusher 24 does not to rely on the use of springs or magnets to urge the line towards the cam 20, as it did in the previous application Ser. No. 61/201,817. Instead, as shown in FIG. 2, the pusher 24 is provided with two lateral walls 24*a*, 24*b* that are spaced from each other a distance substantially corresponding to the axial width of the sheave or pulley wheel 16, a transverse line contacting bridging portion 24*d* extending between the lateral walls as shown in FIG. 2, a slightly deflected offset tab or friction-reducing trailing portion 24*d* extending downwardly and rearwardly from the plane of the bridging portion 24*c* as shown. The sheave or pulley wheel 16 is shown to have spaced circular surfaces on the lateral walls that are configured to be in contact with the internal surfaces of the lateral walls 24*a*, 24*b* to provide at least some degree of friction there between, so that rotation of the wheel 16 imparts frictional forces to the pusher 24 that tend to rotate the pusher in the same direction as the rotation of the pulley or sheave wheel. When the line portion 52*a* is pulled downwardly, in FIG. 1*a*, by applying a tension to the line, the sheave wheel 16 rotates in a clockwise direction, aided by the roller 53*b*, urging the pusher 24 to likewise rotate in a clockwise direction, to the extent permitted by the pin 28. However, when the line portion 52*a* is released the tension applied to the line portion 52*c* by an external load the tension in the line is reduced to zero or substantially zero and the line moves in the direction of the load, causing the sheave or pulley wheel 16 to rotate, aided by the roller 53*b*, in a counterclockwise direction, urging the pusher to likewise rotate or pivot in a counterclockwise direction and pushing the vertical line portion 52*a* of the line towards the cam 20. This causes the spikes or gripping points 20*i* and 201 to successively engage the line and cause the cam 20 to pivot in a clockwise direction, increasingly bringing more and more of the line into contact with the fingers of the cam to wedge the line and almost instantaneously lock the line to prevent uncontrolled movements thereof. This is more fully explained in the aforementioned applications and now issued patents.

When the line portion 52*a* continues to be pulled downwardly, in FIG. 1*a*, such as when raising an object attached to be auxiliary sheave assembly 32, excessive line can be wound about the spool 54 and maintained stored on the spool by forcing a portion of the line into the L-shaped cutout 54', as more fully explained in U.S. Pat. No. 6,234,454, which is incorporated by reference as if fully set forth herein.

Referring to FIGS. 11*a*-13, a modified system is shown for lifting and lowering a bicycle or the like by providing two movable sheaves each of which it is connected to a hook so that two different spaced portions of a bicycle or other larger such objects can be engaged and simultaneously lifted to maintain the object in a substantially horizontal or other predetermined angular orientation during lifting and lowering operations. In place of the C-shaped hooks shown in FIGS. 6*a*-10*b* bicycle hooks 62 are provided that are in the form of an inverted V, with each free end being U-shaped as shown. Once the movable sheave wheel 40 is aligned within the shield 42 one end of the hooks 62 can be passed through the aligned holes 40', 42' and sequential portions passes through the holes until the portion 62*c* is received within the holes as shown in FIG. 12*a*. The hooks 62, therefore, again serve a dual purpose, namely as a pin for rotation of the wheel 40 as well as a hook for supporting an object. The operations are suggested by arrows 1 and 2 in FIGS. 11*a*, 11*b*.

When only two hooks are required, such as for a bicycle, a line portion 52*d* (FIG. 13) can be secured to the holding block supporting the stationary wheel such as by means of the retaining link 64 fixed to the block, frame or housing by means of a link pin 66. The end of the line may be tied in a knot 52*e* or otherwise fixed as shown in FIG. 15.

To provide vertical movement of a hook at the cleat housing 14 a second fixed sheave 58 is provided mounted on a pin 60 spaced from the fixed sheave the 16, so that an additional movable sheave 32' can be supported by the line forming a loop between the two fixed sheaves 16, 58, as shown in FIG. 13. The cleat 12', including the cam 20 and pusher 24 provide a failsafe mode of operation in the event that the line is released accidentally or inadvertently. It will be appreciated that when the line and the spool are pulled down both movable sheaves or pulleys will move up substantially simultaneously to raise an object. The hooks will likewise be simultaneously lowered when line is released at the spool end of the line.

Figure 17A:
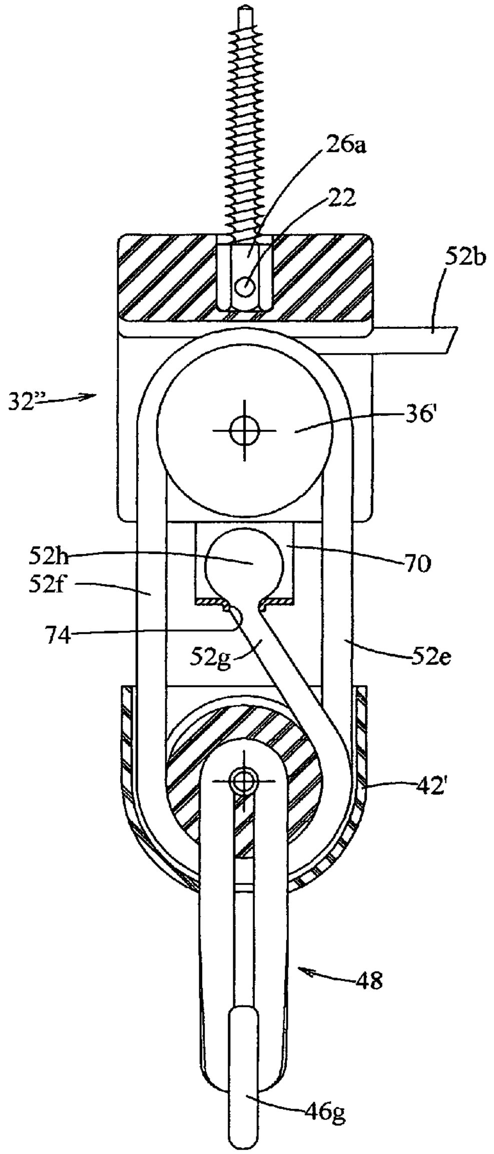
FIG. 17*a*, partially in cross-section, illustrates a pulley or sheave assembly for lifting a single heavy object preferably with the use of a failsafe cleat of the type shown in FIG. 1*a;*
Figure 17B:
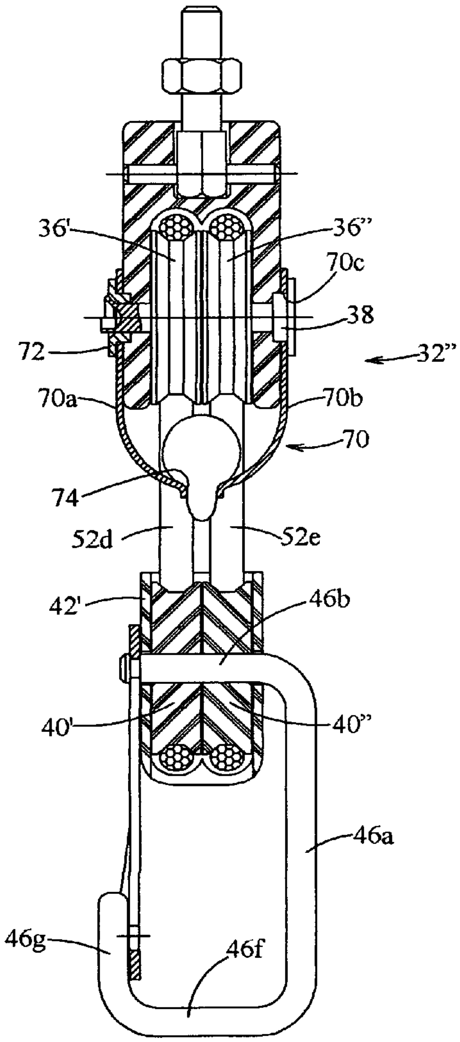
FIG. 17*b* is a front elevational view, partially in cross-section, of the pulley or sheave assembly shown in FIG. 17*a;*
Figure 18A:
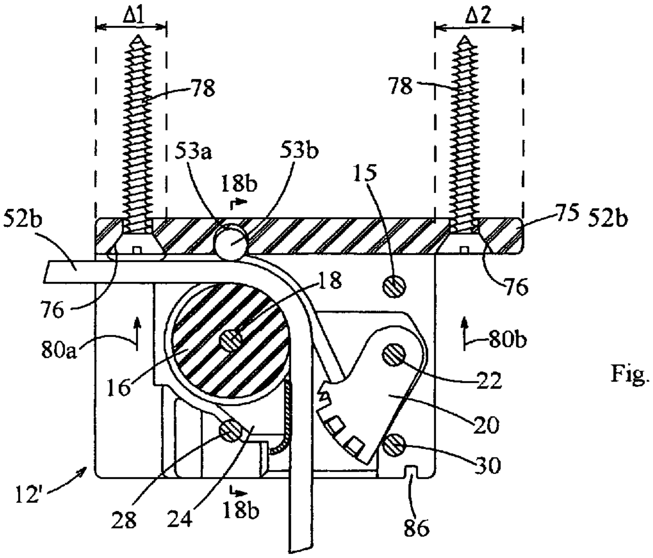
FIG. 18*a* is a side elevational view, partially in cross-section, of a modified cleat that incorporates an alternate design for facilitating connection to a ceiling with conventional fasteners.
Figure 18B:
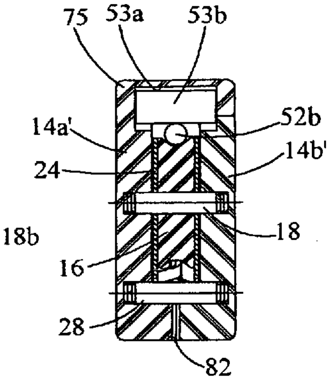
FIG. 18*b* is a cross-sectional view of the modified cleat of FIG. 18*a*, as viewed along line 18*b*-18*b;*
Figure 19:
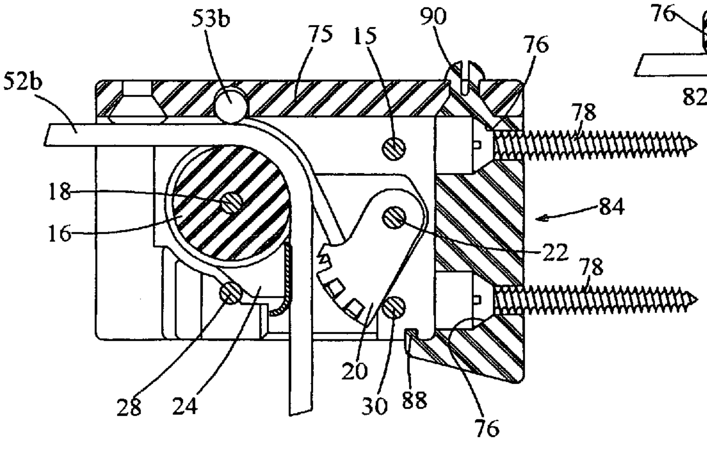
FIG. 19 is similar to FIG. 18*a*, illustrating a wall adapter that can be used with the cleat of FIG. 18*a* for facilitating attachment of the cleat to a vertical surface such as a wall or a vertical member.
Figure 20:
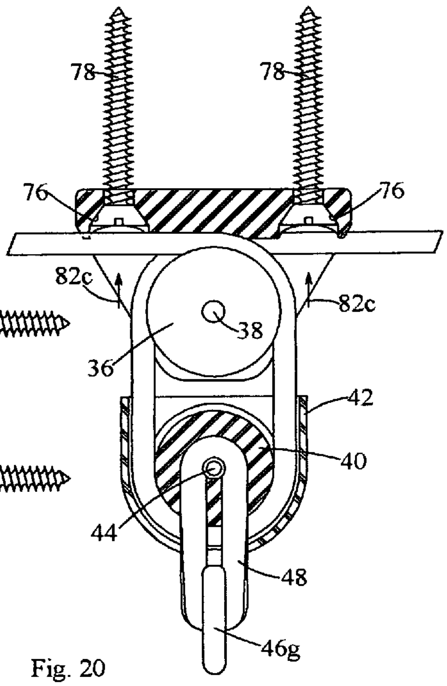
FIG. 20 is similar to the pulley or sheave assembly shown in FIG. 1*a*, but provided with a modified mounting bracket for facilitating mounting by providing adequate clearances for the fasteners and conventional tools such as a screwdriver for driving the fasteners.

When a single hook is required for lifting/lowering a single object, FIGS. 16*a*-17*b* illustrate modified constructions, for achieving that function. A retaining link 64' is used, as aforementioned, to secure the end of the line at the fixed housing, frame or support structure 14' attached to the ceiling 11*a*, 11*b* or to a wall 11*a'*, 11*b'* as shown in FIG. 16*b*. With the arrangement of pulleys as shown the mechanical advantage is two so that a user needs only apply one half of the force corresponding to the weight of the article or object being lifted. A similar construction is shown in FIGS. 17*a*, 17*b* for an auxiliary sheave assembly in which a depending bracket 70 having upper ends secured to a pin 38 and a washer 72 being provided with a hole 74 through which the end of the line 52*g* may extend and be terminated in a knot 52*h*. The bracket is used in place of a connecting link. By using two pulley wheels 36', 36" on top as fixed wheels and two movable wheels 40', 40" within the casing or shield 42' a mechanical advantage of four may be achieved.

In an effort to simplify mounting of both the cleat as well as the auxiliary sheave assemblies, FIGS. 18*a*-20 show mounting holes with counter sinks 76 located in positions to facilitate insertion of a screw 78 with a screwdriver in a convenient manner. This construction provides clearances 80*a*, 80*b* (dimensions Δ1, Δ2, respectively) for the screwdriver and screws at 80*a*, 80*b*, and 82*c* in FIG. 20. For mounting on a wall, a wall adapter 84 is used that cooperates with a recess 86 (FIG. 18*a*) in the cleat housing and has a locking ridge or lip 88 (FIG. 19) dimensioned to mate within the recess, a snap fastener 90 being receivable within the mounting holes 76, shown in FIG. 19. Thus, the wall adapter 84 can be attached to a wall or vertical support member in a convenient manner. The cleat may be secured to the adapter by snapping it in place by initially inserting the snap fastener 90 through the hole 76 and urging the locking lip 88 to snap into the recess 86. These designs facilitate mounting both cleats and auxiliary pulleys or sheaves by almost any user by using a simple screwdriver.

FIGS. 21*a*-22*c* illustrate additional constructions of movable sheaves that use conventional pins or rivets to secure the wheels to the associated shields or covers, with U-shaped hooks supported on the pivot pins or rivets in any conventional manner. Holes 42*c* are provided at the lower regions of the shields or covers 42 to provide a means for water to escape or be removed from the shields or covers when these are used outdoors and rainwater may otherwise accumulate therein. The assemblies described herein may be used indoors or outdoors to accommodate decorative as well as environmental conditions.

Figure 21A:
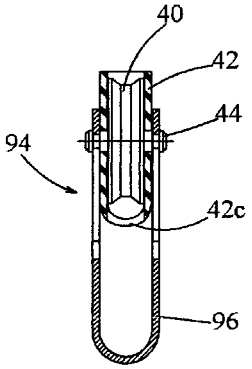
FIG. 21*a* is a front elevational view of a modified movable pulley or sheave construction for supporting an object by means of a flat U-shaped strap.
Figure 21B:
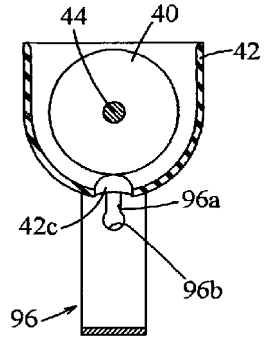
FIG. 21*b* is a side elevational view, partially in cross-section, of the modified movable pulley or sheave shown in FIG. 21*a;*
Figure 21C:
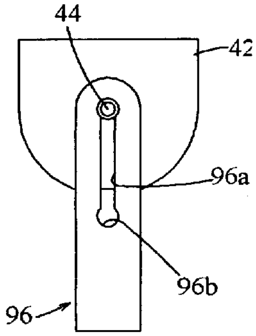
FIG. 21*c* is similar to FIG. 21*b* showing the movable pulley or sheave ready for supporting a load, such as a potted plant.
Figure 22A:
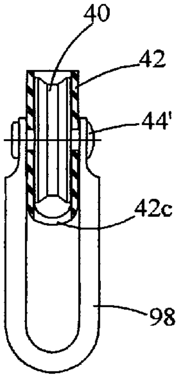
FIG. 22*a* is similar to FIG. 21*a*, but showing the use of a U-shaped support member in the form of a bent rod instead of a flat strap.
Figure 22B:
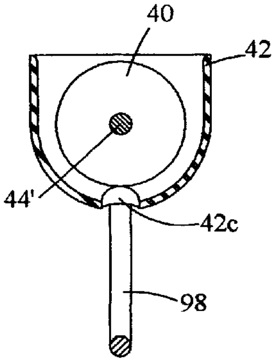
FIG. 22*b* is similar to FIG. 21*b* for the support member shown in FIG. 22*a;*
Figure 22C:
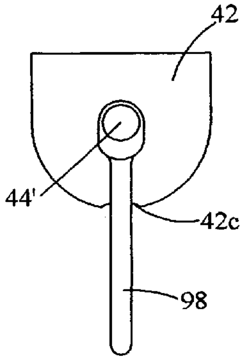
FIG. 22*c* similar to FIG. 21*c* for the support member shown in FIG. 22*a*.

Preferably all of the embodiments that have been described provide the holes 42*c* at the bottoms of the covers or shields 42 to insure that no water accumulates therein, whether used indoors or outdoors, as shown in FIGS. 21*a*-22*c*. In FIGS. 21*a*-21*c* the hook 96 is suspended on the same pin 44 that also supports the sheave 40 and is formed of a bent flat strip of material such as steel or aluminum. Each end of the hook 96 is formed with the slots and holes detailed in FIGS. 6*a*-6*b* to facilitate mounting of the hook on the pin. In FIGS. 22*a*-22*c* a similar construction is shown in which the bent strip 96 is replaced with a bent rod 98 with flattened ends as shown and secured by a rivet that also serves as a pivot pin for the sheave 40.

Figure 23A:
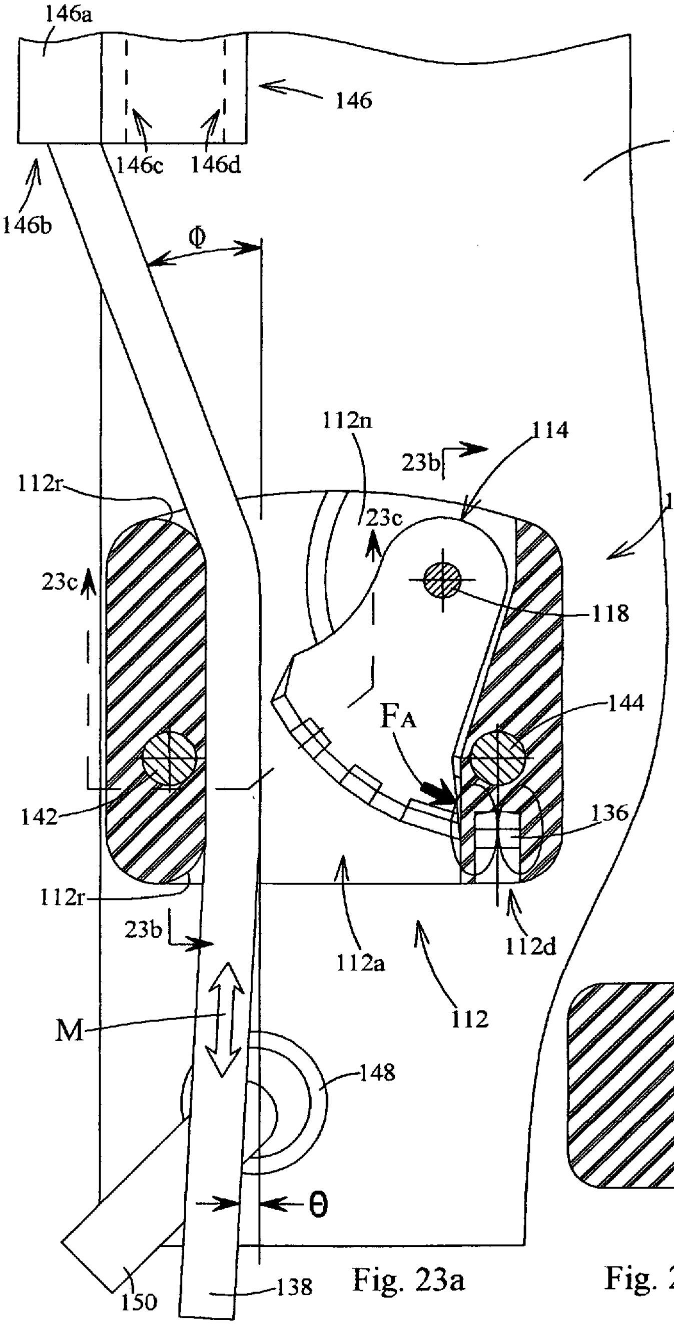
FIG. 23*a* is a side elevational view, in cross-section, of a cleat in accordance with the invention when used as a leech-line cleat secured to a sail.
Figure 23B:
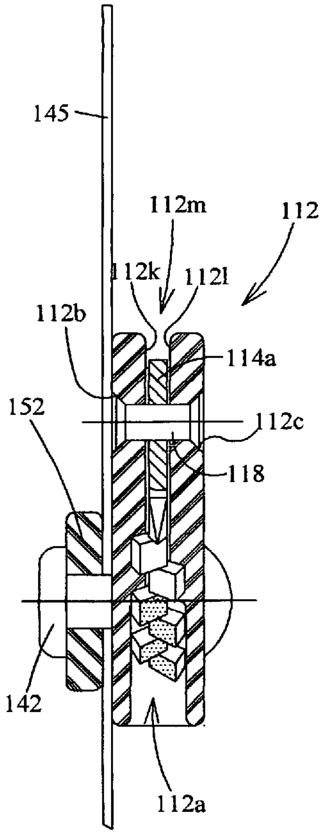
FIG. 23*b* is a front elevational view, in cross-section, of the sail-mounted cleat shown in FIG. 23*a;*

One further application of the cams 20, 114 is shown in FIGS. 23*a*-23*b*, where the housing 112 of the cleat 110 and a plate 152 are secured by means of rivets 142, 144 to a trailing edge of a sail 145 of a sailboat. Such cleat 110 is commonly referred to as a leech-line cleat for controlling the line 138 ("leech line").

The cavity 112*a* is dimensioned and configured to movably receive a cam 114. The housing 112 is provided with openings 112*b*, 112*c* (FIG. 23*b*) for receiving transverse pins 118 that extend through the cavity 112*a*. The openings 112*b*, 112*c* may be provided with bevels on the exterior surface of the housing as shown for receiving tapered heads of the pins. An opening 112*d* is provided adjacent to the cavity 112*a* as shown for receiving magnet(s) 136 for attracting the cam 114 towards the magnets and away from the line 138, a function that is desirable in an unstable environment such as on a sailboat. In other, stable environments where the cleats are attached to fixed support surfaces reliance may be had on gravity to drop the cam to increase the spacing from the line.

Figure 23C:
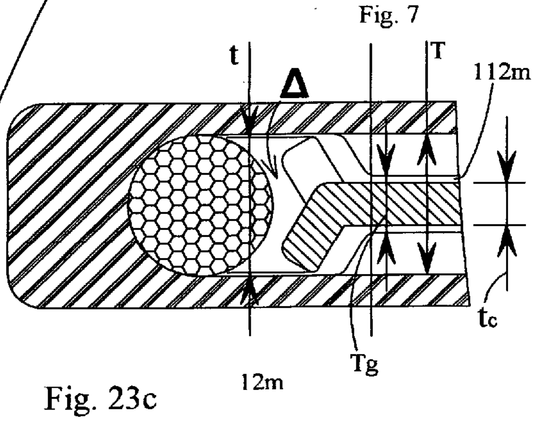
FIG. 23*c* is a cross-section of the cleat shown in FIG. 23*a*, taken along line 23*c*-23*c*.
Figure 24A:
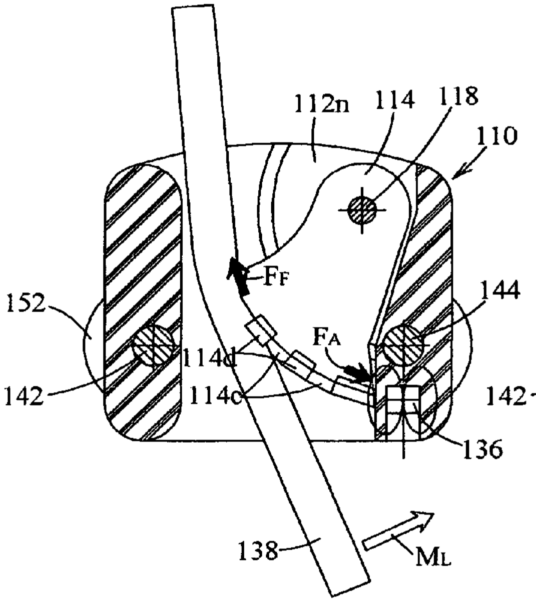
FIGS. 24*a*-24*d* illustrate the manner of contacting the cam shown in FIGS. 23*a*, 23*b*, 23*c* from the at-rest, non-contacting condition to a leech-line locking condition.
Figure 24B:
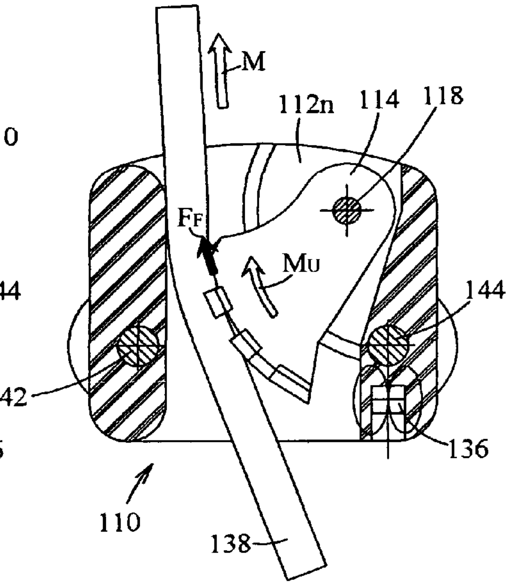
Figure 24C:
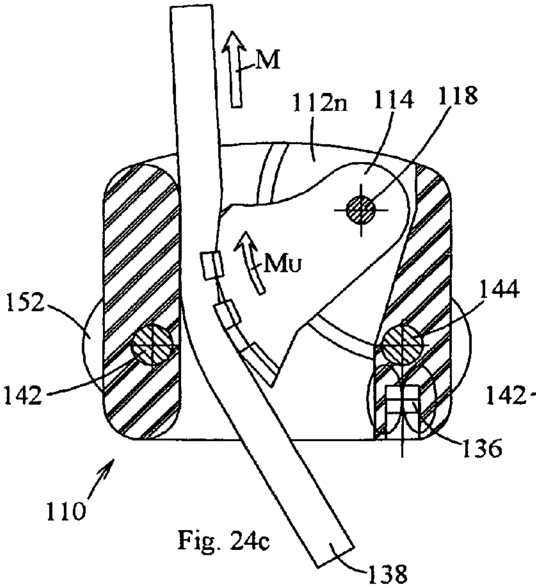
Figure 24D:
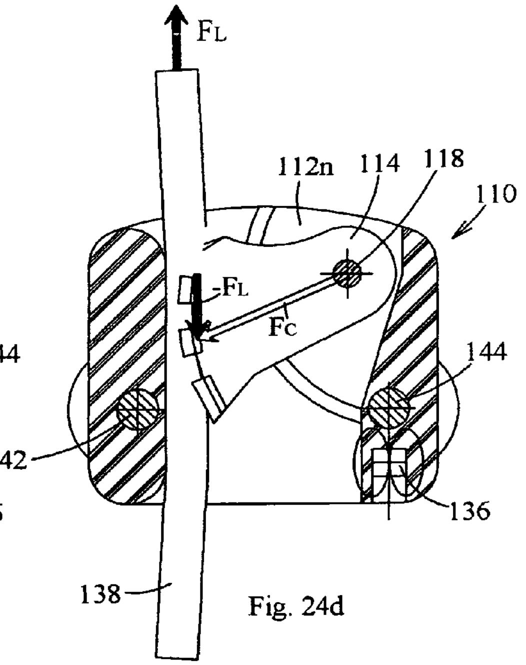

Referring to FIG. 23*c*, each line cleat 110 of FIGS. 23*a*, 23*b* is shown in the assembled state and in cross-section to illustrate the generally V-shaped cross-section forming the line receiving region of the cam 114. However, the cross-section may also assume other cross-sections suitable for receiving a line, such as U-shaped, semi-circular, etc. that can contact a significant circumferential surface of the line. The cavity 112*a* includes spaced parallel surfaces 112*k*, 1121 (FIG. 23*b*) that form a narrow region 112*m* in the form of a narrow gap having a width $T_g$ (FIG. 23*c*) slightly greater than the thickness "$t_c$" of the flat portion 114*a* to receive the flat portion with some clearance to allow the flat portion to freely move within the gap or narrow region 112*m* when the cam 114 pivots about the pin 118. The rest of the cavity 112*a* beyond the gap or narrow region 112*m* has a thickness "T" that essentially corresponds to the diameter "d" of the line 138 to receive the line with clearance preferably without compressing the line or creating friction as the line moves through the cavity 112*a* along direction M. The maximum transverse dimension "t" (FIG. 23*c*) of the offset pads or segments 114*c*, 114*d* is slightly less than the width "T" of the cavity so that the cam pads or segments can move freely within the cavity as the cam pivots about the pin 18.

The line 38 is normally spaced a distance Δ (FIG. 23*c*) from the inclined pressure pads 114*c*, 114*d*, providing a safe margin of clearance that normally prevents the line 138 from engaging the cam 114. As a further measure to prevent such undesired inadvertent or premature contact of the line 138 with the cam 114 the line is preferably maintained slightly deflected from the vertical by an angle $\Theta°$ greater than 0° (FIG. 23*a*). Even an angle Θ of 1° or 2° is sufficient, although greater angles can be used. Similarly, the housing 112 may be mounted so that the load force $F_L$ is slightly offset an angle Φ off the vertical in a direction away from the position of the cam 14 to promote contact with the housing and separation from the cam.

The lower end of the leech line 138 is accessible to the user. However, the upper end of the line extends into a channel 146*b* of a sleeve or pocket 146*a* formed by a folded strip 146 of material sewn to the sail along stitch lines 146*c*, 146*d* after passing through the cleat 110. A line 150 may secure the lower corner of the sail by means of a eyelet 148. To prevent excessive friction the housing is preferably provided with rounded edges 12*r* at the leading and trailing ends of the line-receiving channel in the cleat cavity.

As with the cleat 110, the line 38 is preferably maintained inclined at an angle to avoid premature contact of the line with the cam. In FIG. 23*a* the angle Θ may be comparable to the angle Θ, although this angle may be somewhat less since there is no pusher force to overcome. Referring to FIGS. 24*a*-24*d* the sequence of, positions of the cleat 110 is shown to arrest or lock the movements a leech line. Initially, the leech line is manually moved in the direction $M_L$. While the degree of movement $M_L$ is not critical any movement is adequate that causes contact between the line and the cam. The cam 110 progressively and increasingly compressed the line and when the friction forces rise to a sufficient level they are adequate to stop the leech line, as represented by the force $F_F$.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A cleat with automatic line-locking, comprising a frame having proximate and remote sides and formed with a passageway, extending between said proximate and remote sides, for receiving a line for movement along a first line moving direction from said proximate to said remote sides and an opposing line pulling direction from said remote to said proximate sides, and defining a line beating surface or limit stop on one side of said passageway for limiting excessive transverse movements of the line in a direction to said one side of said passageway; attaching means for attaching said frame to a support surface; cam means on said frame on the other or opposite side of said passageway and having a line engaging portion normally spaced a predetermined distance from the line, said cam means being movable between a line releasing position and a line locking position, said cam means being arranged to normally disengage from the line, engagement of the line by said cam means to said line locking position while advancing the line in said first line moving direction from said proximate to said remote sides creating a force couple that wedges the line between said line bearing surface or limit stop and said cam that tends to arrest or stop the line relative to said frame fixed on the support surface, said cam means being formed of flat sheet material defining a cam plane and a predetermined thickness in a direction transverse to said cam plane and said line engaging portion being formed of a plurality of generally flat pressure-engaging segments or pressure pads that are angularly offset to opposite sides of said cam plane and define a transverse width that is greater than the predetermined thickness of the flat sheet material of the cam and together generally defining a line-receiving region having a generally uniform cross-section configured to frictionally engage the line in said line locking position.

2. A cleat as defined in claim 1, further comprising a pusher for urging the line towards the passageway and into contact with said cam means in response to movement of the line in said first line moving direction.

3. A cleat as defined in claim 1, wherein said cam means is formed of a single sheet of material.

4. A cleat as defined in claim 1, wherein said cam means is formed of two superimposed sheets of material.

5. A cleat as defined in claim 2, wherein said pusher is formed of two parallel spaced plates and a bridging flat member that serves as said bearing surface or limit stop for the line.

6. A cleat as defined in claim 5, wherein said bridging flat member is curved outwardly to better fit and engage the line.

7. A cleat as defined in claim 1, wherein the angular offsets of said segments or pressure pads from said cam plane are in the range of 50-70 degrees from said cam plane to together define total angular offsets between segments or pressure pads from 100-140 degrees.

8. A cleat as defined in claim 7, wherein said offset angles from said cam plane is 60 degrees for a total angle defined by said pressure pads or segments is 120 degrees.

9. A cleat as defined in claim 1, further comprising an auxiliary sheave assembly having a supporting member and linked with the line extending through said cleat to provide automatic failsafe operation for raising and lowering an object on said supporting member by said cleat when the line is released.

10. A cleat as defined in claim 9, wherein said supporting member is a hook.

11. A cleat as defined in claim 9, wherein said supporting member is a loop.

12. A cleat as defined in claim 9, wherein said auxiliary sheave includes a fixed sheave and a movable sheave supported by the line extending about said sheaves, said movable sheave including a housing or cover supporting a pin or shaft on which said movable sheave is rotatably mounted and that supports said supporting member.

13. A cleat as defined in claim 12, wherein said pin or shaft forms part of said supporting member.

14. A cleat as defined in claim 1, wherein said bearing surface or limit stop is a fixed internal surface within said frame.

15. A cleat as defined in claim 1, further comprising a pusher for normally urging or biasing the line in the direction of said cam means when the line moves in said first line moving direction.

16. A cleat as defined in claim 15, further comprising a sheave within said frame for redirecting the direction of the line and being arranged on a side of said passageway opposite to that of said cam means.

17. A cleat as defined in claim 16, wherein said sheave forms part of said bearing surface or limit stop.

18. A cleat as defined in claim 16, wherein said pusher comprises two parallel side walls one on each side of and in contact with said sheave and a bridging portion connecting said side walls and facing the line, said side walls being frictionally engaged with said sheave to impart rotation to said pusher and movement of said bridging portion towards the line when the line rotates said sheave while moving in said first line moving direction.

19. A cleat as defined in claim 18, wherein said bridging portion is curved outwardly to conform to the external shape of the line.

20. A cleat as defined in claim 18, further comprising biasing means for applying a pressure on the line as it moves over said sheave to promote rotation of said sheave with movement of the line.

21. A cleat as defined in claim 1, further comprising biasing means for urging said cam means in a direction away said passageway.

* * * * *